Sept. 29, 1953 — T. E. PHILIPPS — 2,653,986
BATTERY PLATE SEPARATOR
Filed Oct. 24, 1951
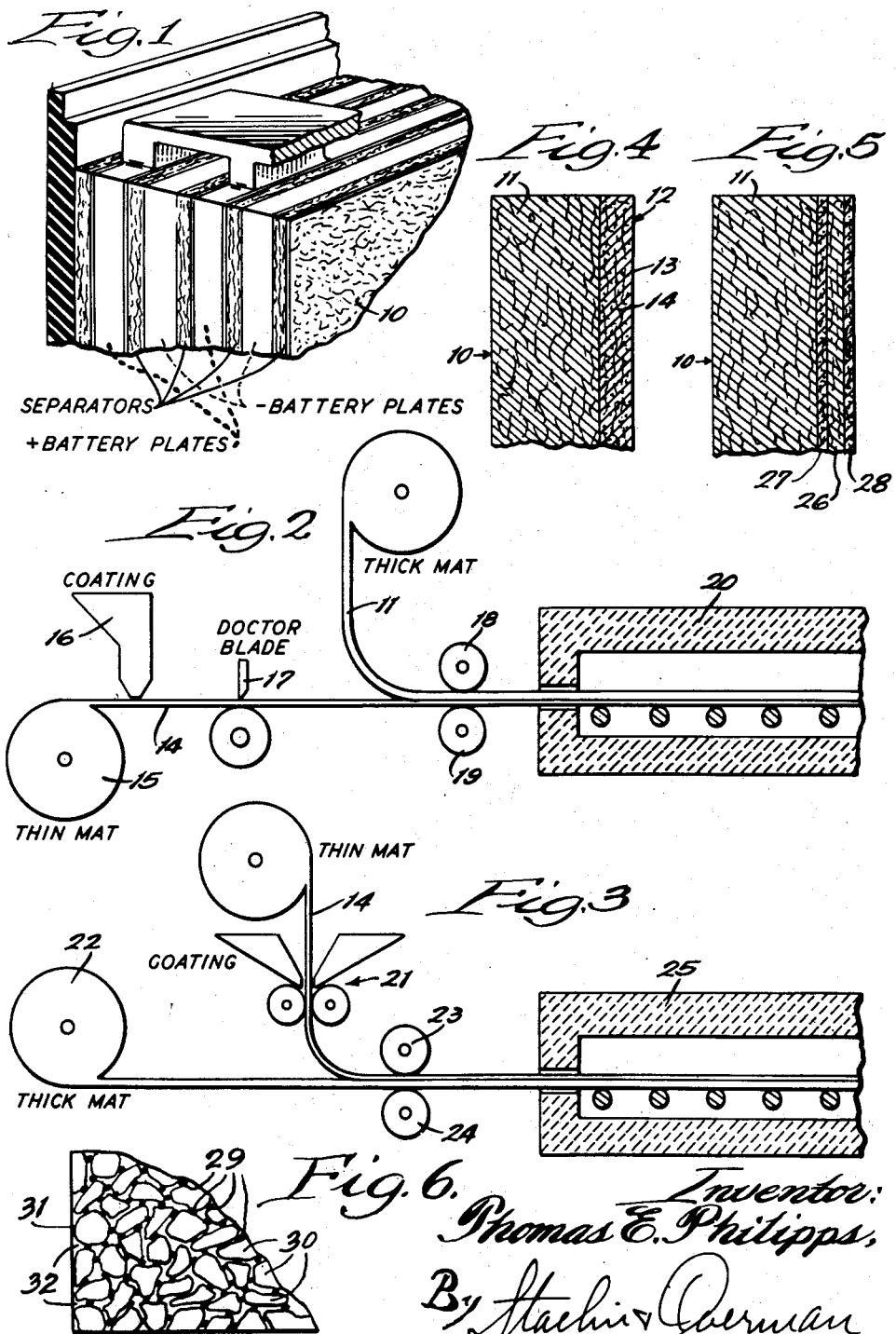

UNITED STATES PATENT OFFICE 2,653,986

BATTERY PLATE SEPARATOR

Thomas E. Philipps, Granville, Ohio, assignor to Owens-Corning Fiberglas Corporation, a corporation of Delaware Application October 24, 1951, Serial No. 252,841

5 Claims. (Cl. 136—145)

This invention relates to interlayers or mats used to separate the positive from the negative plates of electrolytic cells of the type which make up a storage battery. The application is a continuation-in-part of my application filed December 31, 1948, Serial No. 68,600, now abandoned.

The ordinary storage battery is constructed with a plurality of such electrolytic cells formed of a series of connected positive plates and a series of connected negative plates which are interleaved to arrange the plates in closely spaced parallel relation. The plates, formed of lead-antimony alloy grids to which a paste of active material is loosely bonded, are immersed in an electrolyte usually constituted of dilute sulphuric acid.

The useful life of an electrolytic cell is ended when conductive contact is established between the positive and negative plates. Contact of the type described may result from a large number of causes incident to the normal reaction which takes place during charge and discharge of the cell or battery. Frequently, one or both of the plates become buckled, while in posiiton of use, to the extent that actual plate to plate contact is established. Very often the plates become bridged at one or more spaced apart points by metallic deposits or deposits of active material which build up on the walls of the plates, by inadvertent depositions or by other phenomena, such as is often referred to as "treeing." The commonest device to cope with these problems is the practice of inserting a separator or spacer between the plates to operate as a barrier to the build-up of "trees" and to minimize or even prevent buckling.

The qualifications of an acceptable separator have been established through extensive use in various types of electrolytic cells operating on the wet-plate principle; it should have sufficient mass integrity and rigidity to carry itself between the plates and to hold the plates in the desired spaced relation; it should be inert with respect to the electrolyte, and it should not contaminate the electrolyte to the extent of harmfully affecting the reactions of the current generating system; it should not create local reactions with the plates whereby their decomposition is accelerated or whereby effective use is not made of the maximum available area; it should be porous to permit free circulation of the electrolyte whereby improved performance is secured by raising the capacity of the cell at a given discharge rate and to permit the rise of any generated gases; and it should prevent passage of materials, such as is often referred to in the art as "mud." These characteristics are not completely satisfactorily met by grooved but not porous or sufficiently porous plates of wood, glass, or rubber often used in battery assemblies. Nor are they satisfactorily met by the more recently developed molded ebonite plates.

Another factor which influences the life and utility of the cell is the rate of loss of active material from the face of the plates, especially from the face of the positive plate to which it is weakly bonded. To minimize this loss, it has been the practice of the industry to insert a retainer sheet between the separator and the respective plate. To accomplish its purpose in a satisfactory manner, the retainer should be sufficiently porous to permit gases to travel therethrough and to permit the free circulation of the electrolyte; it should contact the plate over substantially its entire area to hold the paste of active material in place, and it should be inert with respect to the materials with which it is associated to the extent of resisting attack by the electrolyte, not contaminating the electrolyte, nor setting up local reactions with the plates.

It is an object of this invention to produce mats for use between positive and negative plates of an electrolytic cell which are formed of glass fiber fabrics and perform both the functions of a separator and retainer.

Another object is to produce a porous fabric constituted essentially of glass fibers which meets substantially all of the qualifications of a good battery separator and retainer.

Most of the desirable characteristics for a mat between positive and negative plates are met by the use of a porous fabric of glass fibers, except that the porous fabric still permits "treeing" to bridge the plates. Therefore, another very important object of my invention is to produce a porous mat of the type described which is formed with a barrier constituted of materials and an arrangement of materials that prevents "treeing" without detracting from any desirable properties resulting from the use of a porous fabric of glass fibers.

These and other objects and advantages of this invention will hereinafter appear and for purposes of illustration but not of limitation, embodiments are shown in the accompanying drawings, in which:

Figure 1 is a perspective view of a portion of a storage battery embodying the present invention;

Figure 2 is a schematic view of one form of apparatus for the production of a structure embodying the invention;

Figure 3 is a schematic view of a modified form of apparatus;

Figure 4 is an enlarged sectional view of a structure formed by the method illustrated in Figure 2;

Figure 5 is a similar view of a separator formed by the method illustrated in Figure 3; and Figure 6 is a highly magnified view of the layer material used on separators of the present invention.

In the layer material for separators of the prior art, the binder was intimately mixed with the layer composition. Instead of forming particles, the binder formed films which were substantially continuous throughout the separator. Naturally, this greatly reduced the porosity. In order to obtain some desired degree of porosity, it then frequently happened that the materials used were made less dense. Such a change, however, only increased the opportunity for "treeing," and the like. Consequently, the goals of desirable porosity and resistance to treeing seemed inconsistent and irreconcilable.

It has also been proposed to make a battery separator comprising a porous sheet, such as of glass fibers, having a slightly porous sheet of synthetic plastic material as a coating. The coating is designed to reduce the porosity of the first sheet and thereby also reduce "treeing" or "bridging."

But here, as before, a reduction of porosity only introduces new problems. As an example, circulation of electrolyte becomes increasingly difficult. Also, gas bubbles formed during the discharge of the battery cannot readily rise and escape, resulting in a lowering of battery efficiency.

The present invention is based upon the discovery of a greatly improved interlayer or battery separator characterized chiefly by increased porosity without a sacrifice of any of the previously mentioned desirable properties, such as resistance to "treeing."

More particularly, the present invention provides an interlayer or separator comprising a porous mat, preferably made of glass fibers, having a substantially non-impregnating layer comprising a combination of minute, distinct, separate particles or pebbles.

Some of the particles serve to bind the other particles one to another to create an integral mass. Thus, a structure is obtained in which the particles or minute pebbles make substantially only pin-point contact with each other. Consequently, the area surrounding each point contact is open for the free passage of fluids. As a result, desirable porosity is easily obtained by the present separator and yet there is not a sacrifice in density or the like which makes the separator susceptible to 'treeing" and "bridging." Nor is there a consequent loss of any of the other previously mentioned desirable properties.

The layer particles may be made of any material which is inert to battery action and capable of reduction to minute particle form. The size of such particles may vary widely depending on the final properties desired. As an example, a satisfactory diameter size may range from 10 to 80 microns, although other sizes may be used.

Materials which are or can be comminuted to form layer particles of the present invention include siliceous matter comprising silica, such as ordinary, substantially iron-free sand; and silicates, such as aluminum silicate, pyrophyllite, wollastonite, pumice, and substantially iron-free clays. Silica is preferred since it is easily obtained in a finely divided state and is very inert to the chemical action of a battery.

A highly preferred form of silica is diatomaceous earth, the material composed of skeletons of the diatoms and like unicellular algae whose walls are thought to have acquired silicon through chemical double decomposition with siliceous matter present in the same environment.

The particles of diatomaceous earth are each composed of a multiplicity of tiny, petrified skeletons of the diatoms. Consequently, each particle of the skeletonized diatoms is itself full of open cavities and pores.

It has been estimated that forty million of a given species of these fossil remains of unicellular plants may be contained in one cubic inch. Yet microscopic examination shows each one to be delicately fashioned into a highly ornate structure with numerous channels, perforations and nodules, all combining to give extensive surface area. The diameter or longest dimension of such particles varies from one to 100 microns. An average is 25 microns.

As a result, a separator of the present invention utilizing diatomaceous earth and made according to the present invention has excellent porosity since paths of flow are available through as well as around these particles. Yet the openings in the skeletonized diatoms are not sufficiently large to encourage "treeing," "bridging," and the like.

Over 10,000 varieties of diatoms are known, so no attempt is made to list possible choices. However, examples of forms or names by which these skeletonized diatoms are known include diatomaceous earth, siliceous earth, infusorial earth, kieselguhr, diatomite, tripolite, ceyssatite, guhr, bergmehl, fossil flour, farine fossil, and tellurine. They are also obtainable under the trade names "Celite" and "Dicalite."

The binder particles which serve to bind the layer particles into an integral mass may comprise elastomers such as butadiene-styrene copolymers (GRS or Buna S), natural rubber, butadiene-isobutylene copolymers, polyisobutylene, organo-silicon elastomers, butadiene-acrylonitrile copolymers, and chloroprene polymer.

The elastomers may be applied as hereafter shown from a non-solvent suspension or emulsion, for example, from an emulsion like natural latex wherein the rubber is present as minute, distinct separate particles.

Elastomeric binder particles are preferred because separators having this type of binder are much more flexible and resistant to handling and cracking on bending. If these properties are not essential or desirable, it is also possible to use other types of resins for the binder particles. For example, thermosetting resins such as phenol-formaldehyde and thermoplastic resins such as plasticized polystyrene, plasticized polyvinylidene chloride, polymethyl methacrylate, and the like may be so used when suspended, for example, as particles in a non-solvent medium such as water. In the case of thermosetting resins, the particles are preferably partially cured.

Of the elastomers listed, the butadiene-styrene polymer formed by reacting two parts by weight of butadiene with three parts by weight of styrene has been found to provide improved and unexpected results. The reasons for this behavior are not fully understood, but it has been noted that polymers formed from other ratios are less coherent and, for example, upon drying as an adhering layer tend to separate in spots or breach and form gaps which may even reach through the layer.

More important, it has been found that a butadiene-styrene polymer of the described weight ratio has a fluidity at the temperatures of fabrication which makes it most adaptable to the realization of the objects of the invention. In particular, it has been discovered that a butadiene-styrene polymer, reacted as described in a 2:3 weight ratio, distributes itself most efficiently among the layer particles. As an instance, it has been noted that only one-half as much of this polymer was needed to bond silica particles in the preparation of a separator as was required when a butadiene-styrene polymer reacted in a 1:1 weight ratio (the usual ratio of GRS rubbers) was used. Apparently, a butadiene-styrene polymer of the 2:3 weight ratio has a much better fluidity which allows it to be easily distributed among the layer particles, and yet, at the same time, the fluidity is not so great that under the described temperatures of fabrication, the elastomer particles lose their individuality and become fused with other particles to film over the layer particles and destroy their porosity.

While the butadiene-styrene polymer reacted in a 2:3 parts by weight ratio provides the described desirable results, and additionally has excellent physical properties when dry which allow a separator to be readily handled, it has been noted that upon immersion in battery electrolyte, this polymer becomes somewhat soft. For stationary batteries, this is not objectionable, but in batteries subject to vibration as in a moving vehicle, the frictional contact or rubbing of ribs, for example, of the separator against an adjacent plate causes the former to be gradually worn away.

In the present invention, this objection is overcome by incorporating another specific butadiene-styrene polymer with the one first described. It has been discovered that a polymer formed by reacting one part by weight of butadiene with four parts by weight of styrene is fairly weak or brittle when dry, but is strong and hard when wet. Further, it has been discovered that a mixture of the two mentioned polymers realizes the advantages of each with none of the disadvantages. For example, a separator of the present invention having a layer comprising the two polymers is stiffer, harder, and stronger and can be readily handled without undue regard for breakage, splitting, or the like, whether the separator is wet or dry.

The ratio of the two polymers in the mixture is not critical. Ordinarily, a range of 3 parts by weight of the 2:3 polymer to 7 parts by weight of the 1:4 polymer up to 7 parts to 3 parts, respectively, of the same polymers satisfies most requirements. A very satisfactory mixture is simply a 1:1 parts by weight blend.

While it has been the practice to use vulcanized elastomers in the preparation of battery separators, it has been found that unvulcanized butadiene-styrene imparts much better flexibility so that the unvulcanized state is much to be preferred.

The binder particles are generally supplied from a suspension or emulsion having 10 to 60 per cent solids content by weight. Of the binder particles mentioned, the nitrogen-free and chlorine-free materials are preferred over the rest to avoid the possibility of any deleterious effect on battery action.

As shown in Figure 6, the binder particles 29 hold the layer particles 30 together to form the porous layer 31 for the glass fiber mat previously described. The binder is thus composed of subdivided, separate little particles which make surface and possibly only point contact with the layer particles, much as the grains do in a body of sand. As a consequence, there is opportunity for pores 32 to exist due to the more or less point contact between the binder particles and layer particles, and therefore a resultant free and easy fluid flow around the layer particles. Particularly in the case of the skeletonized diatoms, the binder particles are especially meritorious since the pores and channels of the diatoms are not filled or filmed over.

In carrying out the invention, I provide a battery plate separator 10 having the semblance of a laminate formed with a relatively thick highly porous layer 11 of bonded glass fibers, and a thinner microporous layer 12 on at least one face of the highly porous layer. The microporous layer is formed of a composition 13 including finely divided silica, or silicate particles bonded by binder particles to create an integral mass and carried by a thin sheet or mat 14 of glass fibers. The sheet 14 may be a glass fiber fabric formed of interbonded haphazardly arranged fibers, the pores of which normally are dimensioned to allow easy circulation of the electrolyte and escape of battery gases.

In a specific application, the microporous layer 12 is separately formed by impregnating a thin sheet, such as a 10 mil thick bonded glass fiber mat 14, with a composition or paste comprising an elastomeric bonding agent in particle form that is inert with respect to the electrolyte or battery acids, and finely divided silica, or silicates. If desired, bodying agents may be incorporated into the layer composition, and the use of wetting agents may lend beneficial effects.

Impregnation of the sheet or mat 14 is calculated to build up a microporous layer to a thickness of about 10 to 40 mils on a 5 to 15 mil sheet. Before the impregnating composition on the sheet has had an opportunity to dry, that is, while it is still in a somewhat tacky stage, the impregnated sheet is joined to a porous mat of bonded glass fibers corresponding, in this illustration, to a 40 mil mat bonded with an adhesive such as a cured phenol formaldehyde resin.

Thereafter, as the diluent is removed from the impregnating composition, the binder particles adhere the layer particles one to another to create an integral mass having interstitial spaces as described which are dimensioned to limit passage chiefly to electrolyte and gases while preventing "treeing" or the passage of "mud."

In the present invention, the manner of removing the diluent can be critical. Ordinarily, the porous mat with its impregnated sheet is passed through a heating means, such as an oven, to hurry the removal or evaporation of the diluent. In such cases, it is desired to confine this operation to as short a time as possible and, accordingly, the temperature of exposure is customarily as high as the materials can stand or economics allow.

However, I have found that there is a fairly definite, critical temperature above which separators of the present invention cannot be heated during the drying operation if elastomers are used as the binder and if all advantages of the invention are to be realized. Non-observance of this limitation fluidizes the elastomer base or binder to such an extent that it loses its subdivided, separate particle shape. Instead, the elastomer becomes film-forming, and in this condition tends to cover the entire surfaces of the layer particles, thereby reducing the size of the openings between the particles and materially reducing the porosity. This is particularly serious in the case of diatomaceous earth since the pores and channels are filled or filmed over.

A secondary objection to film-forming is that it actually hinders removal of the diluent. For example, separators heated above the film-forming temperature of the elastomer used are found to contain more diluent than those heated below for the same period of time.

Actually, whether elastomers or other resins are used as the binder particles, the temperature of the drying operation need be only sufficiently higher than the temperature of the separator to form a thermal potential and encourage evaporation of the diluent. Or the diluent may be removed under sub-atmospheric pressures. However, the time involved especially in the first instance, may be too long to be economically feasible. Therefore, the lowest practical temperature of exposure is in the neighborhood of 125° F. Time of exposure at this temperature may average about an hour or longer.

In fact, in the case of the elastomer binder particles, it is preferable to heat the separators at a temperature sufficient to render the elastomer at least semi-tacky. This has been found to result in a firmer bonding action and to overcome a tendency of the elastomer particles to crumble and leave the separator, especially upon striking battery electrolyte, if not so treated.

For the most part, elastomers in general, and particularly those disclosed herein as possible choices, may be made at least semi-tacky without becoming film-forming if heated in the temperature range of about 200° F. to 220° F. Of course, some elastomers may be heated at a still higher temperature to reduce the time needed for drying. For example, the preferred elastomer, butadiene-styrene, copolymerized in approximately a two to three parts by weight ratio, respectively, can be heated as high as about 375° F. without filming.

In any case, if there is doubt of the temperature at which an elastomer may film, an allowable temperature of exposure can be simply determined by heating for the same time a series of separators containing the elastomer in question at as many different temperatures in the neighborhood of the desired drying temperature, then determining the porosity of each, and observing for what temperature of exposure the porosity begins to decrease. This temperature indicates when filming has begun and therefore a lower temperature, for example, that of the separator next lower in temperature in the test, should be used in practice.

As one method of determining or indicating porosity, the electrical resistance through a separator when immersed in electrolyte may be noted by standard procedures used in the trade. If an increase in resistance is found in a series of separators treated at progressively higher temperatures, the filming temperature of the elastomer has been reached or passed by that separator showing the increased resistance.

The temperatures at which other resins such as the phenolics may be heated when used as the binder particles are well known and are not critical in the practice of the present invention. As an example, semi-cured phenol formaldehyde particles may be polymerized to the final stage at 275° F. or higher. Thermosetting resin binders are preferably applied in the "B" stage of polymerization to prevent their filming during the subsequent heating step.

With respect to the removal of the diluent, the drying operation need be continued only until a substantial amount has been removed. By substantial is meant of the order of 90% or more. Complete removal of the diluent is unnecessary since at any rate the separator tends to absorb moisture from the atmosphere if absolutely dry. As an example, one exposure of a separator containing butadiene-styrene particles at 380° F. for five minutes removed about 98% of an aqueous diluent. Upon the removal of the diluent, the composition will be of a microporous character.

The mat 11 may be formed in the manner described in the Slayter Patent No. 2,306,347 or in other desired ways.

The binder of the highly porous mat 11 and the thin bonded or woven sheet 14 is selected of those resinous or rubber-like materials which are strongly adherent to the glass fiber surfaces and impervious to the battery acids and electrolyte. In addition to phenolics such as phenol formaldehyde, other known binders may be used. Preferably the binder should be nitrogen-free to avoid any possible adverse effect on the battery action. Improved binders for mats to be used in electrolytic cells of the type described are selected from the polyacrylates such as polymethyl methacrylate or polystyrene having an average molecular weight in excess of 65,000. When the binders for the mat 11 are applied from aqueous system, and particularly when polystyrene comprises the bonding agent, additional advantage is derived from the use of a small amount of gelatin or other like proteins in amounts less than one-fourth the weight of base resin. Gelatin functions to stabilize the emulsion or dispersion, but more important, it is immediately operative as an adhesive temporarily to bond the various fibers until the base resin becomes effective for adhesive purposes.

Very often the binder for the mat 11 is applied from solvent solutions of 10 to 40 per cent by weight, in which instance mere evaporation by air, dry or with the aid of elevated temperatures, may be sufficient to set the resinous materials. More often the binder is applied as an aqueous emulsion or dispersion of the type described whereby the resinous materials are deposited as discrete particles on the fiber surfaces and it is necessary to raise the temperature of the particles above their fusion temperature to carry them through an adhesive stage. It is in such aqueous emulsions or dispersions that gelatin or such materials find best use as an intermediate binder until the resinous bond is developed. The amount of binder ordinarily employed varies according to the materials of which it is composed and the type of mat or the arrangement of the fibers in the fabric. Very often sufficient mass integrity is secured by the use of 10 or 20 per cent binder calculated on the basis of solids by weight, but ordinarily best results are secured when the binder content of the mat is above 30 per cent but it seldom rises above 50 per cent.

With respect to the amount of materials used in the microporous layer 12, the ratio of the binder particles to the layer particles may range from 1:1 to 1:4 parts by weight, respectively. Best results are secured when the materials are present within the ratio of 1 part binder particles to 3.3 parts by weight of layer particles.

In aqueous medium, the bodying agent, when used, may consist of gelatin, ammonium alginate, alkali metal alginates or other water soluble resinous or high molecular weight materials. Less than 3 per cent bodying agent is sufficient, but as much as 5 per cent may be used.

Suitable wetting agents may be selected from the group of materials consisting of the dioctyl esters of sodium sulfosuccinate (Aerosols), substituted aromatic sulfonates (Duponols), dibutylphenol sodium disulfonates (Areskelene), sulfonated esters (Tensol), and the like. Less than 2 per cent of the wetting agent ordinarily is sufficient to impart the desired wetting characteristics, although more may be used when desired.

The following examples of compositions for the microporous layer and of methods for their application in the manufacture of a combined separator and retainer are given by way of illustration and not by way of limitation.

COMPOSITIONS

Example 1

20 parts gelatin (3% solids in water solution)
15 parts butadiene-styrene polymer reacted in 2:3 weight ratio, respectively (suspension of 48% solids)
14 parts diatomaceous earth
0.5 part dibutylphenol sodium disulfonate (wetting agent)

Example 2

20 parts butadiene-styrene polymer reacted in 2:3 weight ratio, respectively (aqueous suspension of 48% solids)
10 parts Dicalite

Example 3

40 parts of mixture comprising 40% of butadiene-styrene reacted in 1:4 weight ratio and 60% of butadiene-styrene reacted in 2:3 weight ratio (suspension of 48% solids)
10 parts aluminum silicate
20 parts silica
10 parts ammonium alginate (in 20% solution)

Example 4

40 parts of mixture containing equal amounts of butadiene-styrene reacted in 1:4 weight ratio, and butadiene-styrene reacted in 2:3 weight ratio (suspension of 48% solids)
20 parts gelatin (4% solution)
0.5 part sodium dioctyl sulfosuccinate (wetting agent)
30 parts clay In preparing these compositions, the indicated ingredients are merely mixed together preferably with stirring.

PREPARATION

Example 5

Figure 2 of the drawing illustrates one method of manufacture in which the thin mat 14 is advanced from a roll 15 to receive a deposit of a composition 13 from a coating device 16. Doctor blades 17 serve to smooth the composition and work it into the interstices between the fibers of the mat. Before the composition has had an opportunity to dry, the thicker mat 11 is superimposed and the layers are advanced together between cooperating rolls 18 and 19 which insures their integration. The integrated layers or laminate is carried through a heating oven 20 maintained at a temperature within the range of 125° F. to 375° F. to accelerate the removal of the diluent, which if more time is available might also be effected by a simple air dry. It will be apparent that integration or lamination results from adhesion inherent in the impregnated or coated sheet, and that in the integration there will be little tendency for the composition coating to penetrate the porous mat 11. In the alternative, the two layers may be combined by the separate application of an integrating adhesive to one or both of the layers before integration. This process produces a product which corresponds to that shown in Figure 4.

Example 6

Figure 3 illustrates another technique for fabricating a combined battery plate retainer and separator. By this method the thin mat 14 is impregnated and coated by a roller coating process, indicated schematically by the numeral 21. The impregnated mat converges toward the thicker mat 11 fed from a roll 22 and the two are integrated in superposed relation between rollers 23 and 24 and then advanced through the drying oven 25. The product of this process, illustrated in Figure 5, is a laminate having a relatively thick layer represented by the mat 11 and another layer which may be divided into three parts including a layer 26 of one of the disclosed compositions reinforced with the mat 14 of glass fiber and sandwiched between layers 27 and 28 of the composition which are free of reinforcing glass fibers.

The thickness of the combined separator is ordinarily selected to correspond dimensionally to the span existing between the positive and negative plates of the cell. In most units where the distance corresponds to about 70 mils, the highly porous mat is about 40 mils, but it may be selected of mats ranging from 30 to 60 mils thickness. Correspondingly, the microporous layer may range from 40 mils to 10 mils in thickness. It is preferable, however, to have the highly porous layer 11 of greater dimensional thickness than the microporous layer 12.

Ordinarily it is sufficient if the microporous layer is disposed on only one side of the highly porous layer where it is adapted to hold the paste on the positive plate in position. However, when desired, microporous layers may be arranged with the highly porous layer sandwiched therebetween.

It will be manifest that I have produced as my invention, a battery plate separator which incorporates a retainer member and the separator in one and the same unit; a separator which is highly porous to permit the desired circulation of electrolyte and upward passage of gases and, at the same time, provides a barrier to "treeing" and minimizes the loss of active material from the face of the plates; and a separator which is impervious to the electrolyte and does not cause local reactions with the battery plates.

It should be understood that the article produced by my invention comprises a new and improved laminate which may be used as a plate separator in other types of cells, and which may be used for many other purposes. It will be further understood that numerous changes may be made in the details of construction, arrangement, materials and their concentrations without departing from the spirit of the invention, especially as defined in the following claims.

I claim:

1. A combined separator and retainer for storage batteries comprising a mat of glass fibers mechanically bound one to the other at their junctures and an adhesive microporous composition providing a continuous, non-impregnating cover on at least one side of the mat, said composition comprising diatomaceous earth particles bound by elastomer particles consisting of a 40:60 butadiene-styrene copolymer and a 20:80 butadiene-styrene copolymer to provide both wet and dry strength.

2. A combined separator and retainer for storage batteries comprising in laminar relationship a mat of glass fibers mechanically bound one to another at their junctures by a resin, and a microporous inherently adhesive layer covering at least one side of the mat without impregnating it, said layer comprising particles of diatomaceous earth bound by and making substantially point contact with particles consisting of 30 per cent to 70 per cent of a 40:60 butadiene-styrene copolymer and 30 per cent to 70 per cent of a 20:80 butadiene-styrene copolymer to provide both wet and dry strength.

3. A combined separator and retainer for storage batteries comprising in laminar relationship a mat composed of haphazardly arranged glass fibers which are mechanically bound one to the other at their junctures by a resin, a microporous inherently adhesive layer covering one side of the mat without impregnating it, and glass fibers reinforcing the microporous layer, said layer comprising diatomaceous earth particles bound by and making substantially point contact with unvulcanized elastomer particles consisting of substantially equal amounts of a 40:60 butadiene-styrene copolymer and a 20:80 butadiene-styrene copolymer to provide both wet and dry strength, the ratio of the elastomer particles to the diatomaceous earth particles ranging from 1:1 to 1:4 parts by weight, respectively.

4. The combined separator and retainer for storage batteries of claim 3 wherein the ratio of the elastomer particles to the diatomaceous earth particles is 1:3.3.

5. A method of making a combined separator and retainer for storage batteries comprising preparing an aqueous microporous composition comprising diatomaceous earth particles and unvulcanized elastomer particles present in the range of 1:1 to 1:4 parts by weight, respectively, the elastomer particles consisting of substantially equal amounts of a 40:60 butadiene-styrene copolymer and a 20:80 butadiene-styrene copolymer, impregnating a relatively thin mat of glass fibers with said aqueous microporous composition, laminating the relatively thin mat with a relatively thicker mat consisting of glass fibers mechanically bound one to another at their junctures, and heating the assembly to 375° F. to drive off a substantial amount of water and to adhere the composition to the relatively thicker mat and bind the diatomaceous earth particles to each other through the elastomer particles.

THOMAS E. PHILIPPS.

References Cited in the file of this patent

UNITED STATES PATENTS

| Number | Name | Date |
|---|---|---|
| 1,942,668 | Smith | Jan. 9, 1934 |
| 2,043,954 | Kershaw | June 9, 1936 |
| 2,117,371 | Slayter | May 17, 1938 |
| 2,155,016 | Kershaw | Apr. 18, 1939 |
| 2,335,124 | Konrad et al. | Nov. 23, 1943 |
| 2,484,787 | Grant | Oct. 11, 1949 |
| 2,526,591 | Szper | Oct. 17, 1950 |
| 2,564,882 | Cubberley | Aug. 21, 1951 |
| 2,566,619 | Lyon et al. | Sept. 4, 1951 |
| 2,566,960 | Philipps | Sept. 4, 1951 |

FOREIGN PATENTS

| Number | Country | Date |
|---|---|---|
| 602,520 | Great Britain | May 28, 1948 |